United States Patent
Popli et al.

(10) Patent No.: US 10,776,050 B2
(45) Date of Patent: Sep. 15, 2020

(54) SYSTEMS AND METHODS FOR IMPROVED WRITE FILTER OPERATION WITH PROVISION FOR MONITORING AND PREDICTION TO DELAY SYSTEM REBOOT

(71) Applicant: DELL PRODUCTS L.P., Round Rock, TX (US)

(72) Inventors: Sumit K. Popli, Campbell, CA (US); Suruchi Dubey, Fremont, CA (US); Ryan G. Mason, San Jose, CA (US)

(73) Assignee: Dell Products L.P., Round Rock, TX (US)

(*) Notice: Subject to any disclaimer, the term of this patent is extended or adjusted under 35 U.S.C. 154(b) by 64 days.

(21) Appl. No.: 16/271,060

(22) Filed: Feb. 8, 2019

(65) Prior Publication Data

US 2020/0257469 A1    Aug. 13, 2020

(51) Int. Cl.
*G06F 3/00*    (2006.01)
*G06F 3/06*    (2006.01)

(52) U.S. Cl.
CPC .......... *G06F 3/0659* (2013.01); *G06F 3/0604* (2013.01); *G06F 3/0644* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2002/0144178 A1* | 10/2002 | Castelli | G06F 11/1438 714/15 |
| 2010/0241905 A1* | 9/2010 | Avritzer | G06F 11/1438 714/38.13 |
| 2018/0217940 A1 | 8/2018 | Joshi et al. | |

OTHER PUBLICATIONS

Wikipedia, Overlay (Programming), Printed from Internet Oct. 29, 2018, 4 pgs.
Techopedia, "Ram Disk", What is a RAM Disk, Printed From Internet Oct. 29, 2018, 2 pgs.

* cited by examiner

*Primary Examiner* — Midys Rojas
(74) *Attorney, Agent, or Firm* — Egan Peterman Enders Huston

(57) ABSTRACT

Systems and methods are provided that may be implemented to prevent unexpected and/or uncontrollable system reboots that occur due to write filter overlay and/or RAM disk depletion within system memory of an information handling system by monitoring time-based write filter memory overlay and/or RAM disk usage. This information may be used to predict when the write filter memory overlay and/or RAM disk will fill up with data, and/or to take actions to prevent write filter memory overlay and/or RAM disk usage from reaching a threshold percentage or fractional utilization value that will trigger a system reboot. Those applications and/or data files that are primarily responsible for filling the memory of a write filter overlay may also be identified and stopped or restarted to prevent automatic system reboot due to write filter memory overlay usage.

23 Claims, 7 Drawing Sheets

SYSTEMS AND METHODS FOR IMPROVED WRITE FILTER OPERATION WITH PROVISION FOR MONITORING AND PREDICTION TO DELAY SYSTEM REBOOT

FIELD

This invention relates generally to information handling systems and, more particularly, to write filters and write filter overlays for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A Microsoft Windows Embedded operating system (OS) includes functionality that can prevent the content of a storage medium from being changed. In a typical example, it may be desirable to prevent the operating system image, which may be stored on a particular disk partition or on flash media, from being changed at runtime. To accomplish this, Windows Embedded provides a file-based write filter which operates at the file level and a block-based write filter (or enhanced write filter) that operates at the block level to redirect all writes that target a protected volume to a RAM or disk cache called an overlay. This overlay stores changes made to the operating system at runtime but is removed when the device is restarted thereby restoring the device to its original state.

FIG. 1 illustrates a how a file-based write filter 110 can be conventionally employed by an information handling system to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management application programming interfaces (APIs) 160 to invoke a service of system services 130 (e.g., by calling ReadFile, WriteFile, CreateFile, etc. on a particular file) which will result in I/O manager 120 creating an I/O request packet (IRP) for the request. This IRP will then be passed down through the driver stack.

Unlike a regular Windows operating system, a Windows Embedded operating system (such as Windows Embedded Standard "WES") has a Write Filter that routes all I/O from the disk to an overlay in memory. As depicted in FIG. 1, file-based write filter 110 is positioned at the top of the driver stack and will therefore be able to process an IRP prior to the IRP being passed down to the lower level drivers. File-based write filter 110 can be configured to detect writes targeting a protected volume and redirect them to write filter overlay 140 that is temporarily stored in system volatile memory, rather than allowing them to be passed down the driver stack. As a result, the write will actually occur in overlay 140 rather than to disk 100. File-based write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay. A RAM disk section may also be provided in system volatile memory that is separate from write filter overlay 140. Such a separate RAM disk section may be provided for storing temporary data such as web browsing data, etc.

The size of the overlay 140 employed by the Windows file-based write filter is static and cannot be changed without rebooting. Therefore, the information handling system will be automatically rebooted if the overlay 140 becomes 90% full with data to allow sufficient memory for the Windows OS to perform required housekeeping actions before reboot. Two Microsoft standard warnings are given to the user when the size of data in overlay 140 reaches a certain level: The user is warned when the write filter is almost full (85% of filter 140 is consumed by data), and the user is warned when that the information handling system is about to reboot when overlay 140 is 90% full of data. The information handling system user at this point does not know why the system is going to reboot, nor when the system is going to reboot. The user is only notified that the system is going to reboot.

A FbwfSetCacheThreshold function allows the size of the write filter overlay 140 (in megabytes) to be specified. However, when this function is called, it has no effect on the size of the overlay 140 during the current session. Instead, a newly specified size of the overlay 140 will not be applied until the next session. By default, the size of the overlay 140 in the current Microsoft Windows Embedded operating system is 64 megabytes and can be increased up to the value of FBWF_MAX_CACHE_THRESHOLD.

The Microsoft Embedded Standard operating system (OS) (WES OS) is designed for Virtual Desktop Infrastructure (VDI) use on a thin client (TC) information handling system. It is not designed for local applications or a local browser on the TC. If a user of a TC uses WES TC for non-VDI purposes then write filter overlay consumption and rate of consumption of other local resources (such as RAM disk) by local applications such as web browser (which generates temporary data like cookies and images), media player, PDF reader and other customer applications increases. This affects the TC performance and user experience.

SUMMARY

Disclosed herein are systems and methods that may be implemented to operate write filter-aware information handling systems to achieve improved write filter operation.

Examples of such write-filter aware information handling systems include, but are not limited to, Microsoft Windows Embedded devices such as thin clients, standard Windows OS devices that have a write filter (e.g., such as Windows 10 Enterprise, Windows 10 IOT Enterprise, etc.). Other examples of write filter-aware information handling systems include, but are not limited to, existing personal computer (PC) or other systems with older generation legacy operating systems (e.g., such as Microsoft Windows 7) that have a write filter that is later installed by a lockdown software.

In one embodiment, the disclosed systems and methods may be implemented to prevent unexpected and/or uncontrollable system reboots that occur due to write filter overlay and/or RAM disk depletion within system memory of an information handling system. In one embodiment, a mechanism may be implemented to monitor time-based write filter memory overlay usage and/or RAM disk depletion (e.g., by tracking system up time and overlay utilization rate) and to use this information to predict when the write filter memory overlay and/or RAM disk will fill to reach a maximum threshold percentage or fractional utilization value that will trigger a system reboot.

In a further embodiment, the disclosed systems and methods may be implemented to track which applications and/or data files executing on an information handling system are primarily responsible for filling the system memory, including the write filter overlay (e.g., by not only tracking the number of writes to the memory overlay but also by accurately tracking the identity of which given applications and/or files generate the tracked writes). By notifying the user of the tracked identity of these given applications/files that are filling the system memory (e.g., such as a Windows background process like a virus definition update or background operating system update), false alarms may be prevented in which the user incorrectly assumes the wrong application and/or file (e.g., such as the browser the user is currently using) is responsible for filling memory at any given time and then needlessly closes these assumed applications/files.

In another embodiment, the disclosed systems and methods may be implemented to track relevant resources, and specifically tracking unique or non-overlapping writes to non-temporary files only, while at the same time also ignoring write filter exclusion zones that have been specified by an administrator to identify files that go to Flash memory rather than to the write filter. In a further embodiment, time-based RAM disk usage may be monitored in a similar manner and this information used predict when the RAM disk will fill up with data or reach a maximum threshold percentage or fractional utilization value that will trigger a system reboot.

In one embodiment, the disclosed systems and methods may be implemented on write filter aware information handling systems that are configured to automatically reboot when the amount of data stored in the write filter overlay has reached a predefined maximum data volume threshold (e.g., 90% full or other predefined greater or lesser percentage full). In such an embodiment, the disclosed systems and methods may operate in real time to determine what system components (e.g., both applications and data files) are responsible for causing the write filter memory overlay to fill with data. In a further embodiment, the disclosed systems and methods may additionally or alternatively operate in real time to determine the rate at which the write filter memory overlay is filling up with data and to use this rate to determine other information, such as an estimated time before the next reboot will occur due to the amount of data stored in the write filter memory overlay. This information may in turn be provided to a human user of the system, who may take steps to prepare for the next reboot and/or to avoid the next reboot entirely by modifying overlay data creation behavior of the system resources in a manner that postpones or prevents the next automatic system reboot. In this way, an otherwise bad user experience that occurs due to an unexpected system reboot (which can adversely affect overall business) may be avoided. This in contrast to the bad user experience that often occurs with conventional write filter operation where a user is merely notified that the information handling system is going to reboot, and where the user does not know why the system is going to reboot, nor when the system is going to reboot. It should be noted that during such conventional write filter operation, even when the size of the memory overlay is set to maximum size (FBWF-_MAX_CACHE_THRESHOLD), it is still likely to become full and force the automatic reboot of the system.

In one embodiment, the disclosed systems and methods may be implemented on one or more processing devices of an information handling system to track some or all the write filter and memory overlay specific elements of an operating system that affect system performance and user experience. In such an embodiment, a user may be informed in real time of current status of one or more write filter and overlay specific elements such as write filter and memory overlay consumption, RAM disk memory, disk overlay (overlay optimizer if present) consumption, etc. System components (such as application/s and data file/s) primarily responsible for memory overlay consumption may also be displayed or otherwise provided to the user to make the user aware of why the system is going to reboot due to memory overlay consumption if behavior of these identified resources is not changed before then. A user may be additionally or alternatively informed in real time of a predicted (estimated) time or time duration until the next automatic system reboot (e.g., in a similar manner as the remaining battery charge % for a laptop or cell phone battery is displayed in real time as battery status or battery gauge to a laptop/cell phone user). In this way, a user may check and monitor information as to when the system is going to automatically reboot due to memory overlay consumption. Other information that may be provided in real time to a system user include memory consumption.

In one respect, disclosed herein is an information handling system, including: a system memory having an application and file write data portion that partially occupies the system memory, and at least one of a write filter memory overlay portion having a fixed memory size that partially occupies the system memory or a random access memory (RAM) disk portion having a fixed memory size that partially occupies the system memory; and a programmable integrated circuit coupled to the system memory, the programmable integrated circuit being programmed to manage writes to the portions of the system memory. The programmable integrated circuit may be further programmed to delay or prevent an automatic system reboot due to excessive write filter memory portion consumption and/or excessive RAM disk memory consumption by determining and using at least one of a real time consumption of the fixed memory size of the write filter memory overlay portion and/or a real time consumption of the fixed memory size of the RAM disk portion to cause at least one of a user or the programmable integrated circuit to reduce the consumption of the write filter memory overlay portion and/or the real time consumption of the fixed memory size of the RAM disk portion before occurrence of the automatic system reboot.

In another respect, disclosed herein is a method of operating an information handling system that includes a system memory, the method including: managing writes to multiple portions of the system memory that each partially occupies a part of the system memory, the portions including an application and file write data portion, and at least one of a write filter memory overlay portion having a fixed memory size or a random access memory (RAM) disk portion having a fixed memory size; and delaying or preventing an automatic system reboot due to excessive write filter memory portion consumption and/or excessive RAM disk memory consumption by determining and using at least one of a real time consumption of the fixed memory size of the write filter memory overlay portion and/or a real time consumption of the fixed memory size of the RAM disk portion to cause at least one of a user or the programmable integrated circuit to reduce the consumption of the write filter memory overlay portion and/or the real time consumption of the fixed memory size of the RAM disk portion before occurrence of the automatic system reboot.

DESCRIPTION OF ILLUSTRATIVE EMBODIMENTS

Figure 1:
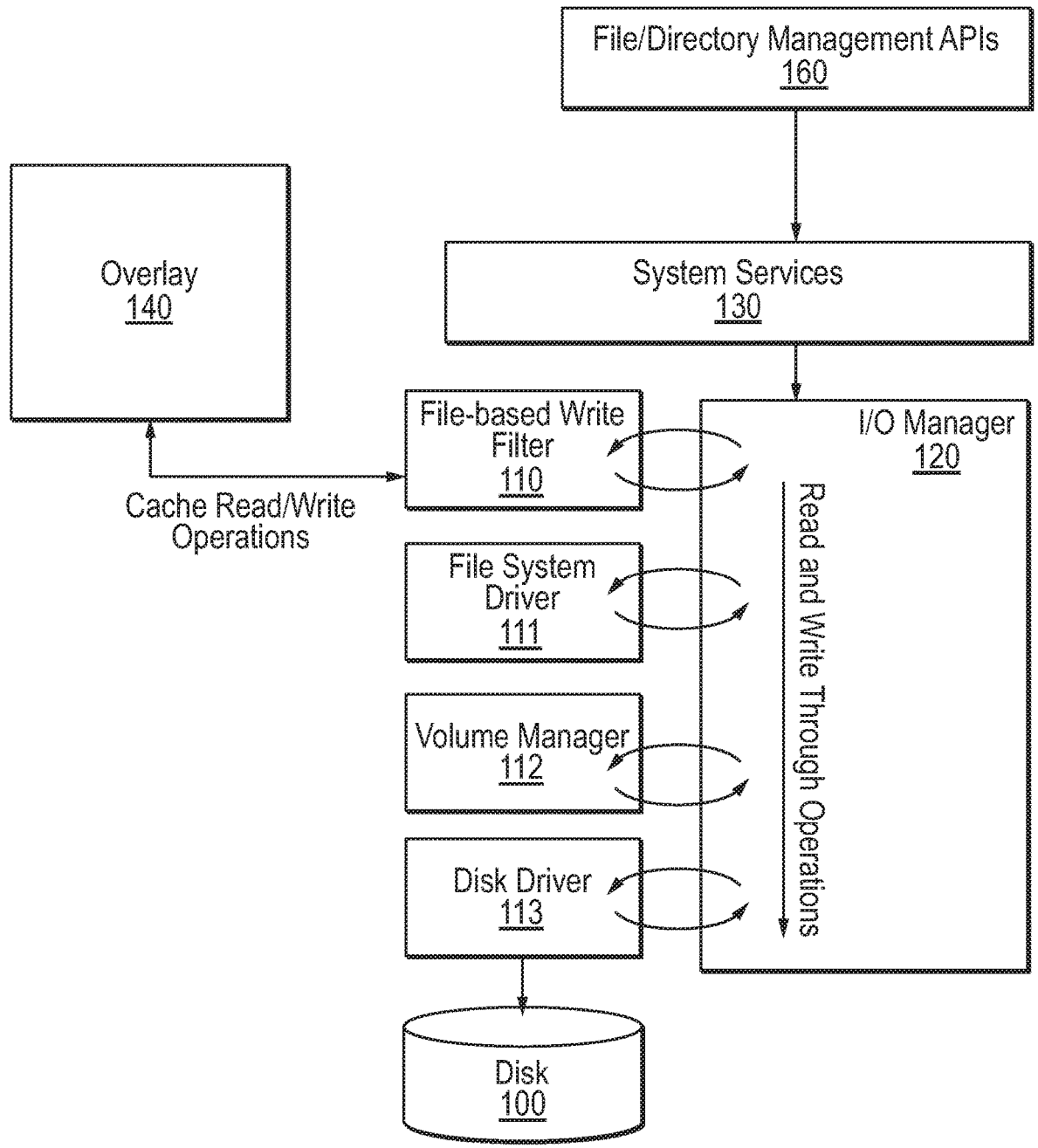
FIG. 1 illustrates a conventional write filter architecture.
Figure 2:
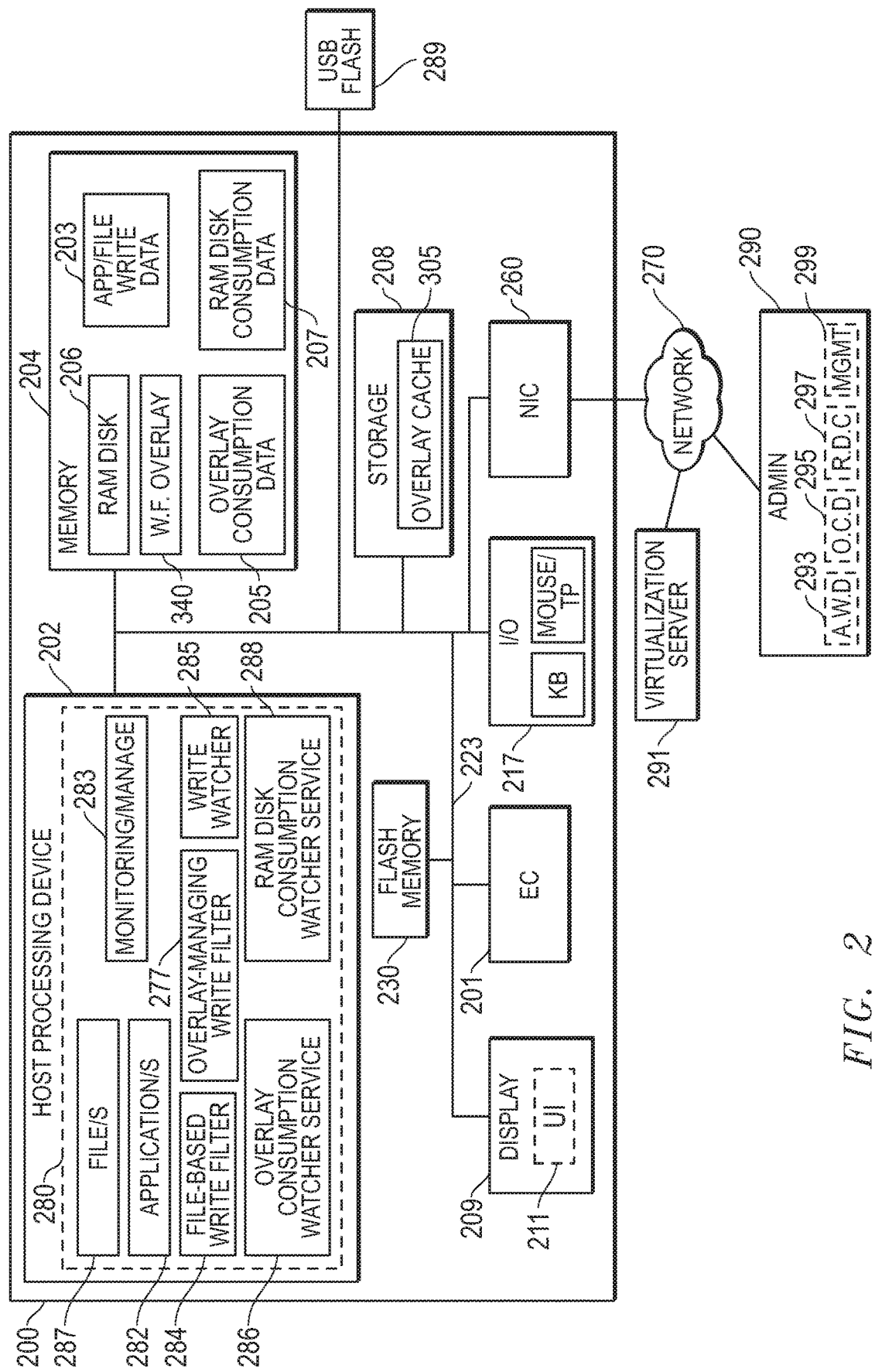
FIG. 2 illustrates an information handling system and network environment according to one exemplary embodiment of the disclosed systems and methods.

FIG. 2 illustrates one exemplary embodiment of an information handling system 200 that is optionally in communication with an administrative server 290 and virtualization server 291 across a network 270, such as the Internet or corporate intranet. Information handling system 200 may be, for example, a thin client that communicates with virtualization web server 291 (e.g., Virtual Desktop Infrastructure or "VDI" server serving a VDI environment such as VMWare Horizon View) that performs at least a portion (or most) of software execution, processing, storage and other tasks for the thin client, meaning that the processing and storage load may be reduced for thin client. In other embodiments, information handling system may alternatively be a fat client such as non-mobile desktop or tower computer, or may be a mobile system such as notebook or laptop computer, tablet computer, smart phone, etc. that has reduced hardware components, In FIG. 2, system 200 includes at least one host processing device 202 (e.g., AMD or Intel-based CPU such as Itanium or any other type of suitable host processing device), one or more buses or communication media 203 (e.g., PCIe bus, USB, SMBus, SATA, other appropriate data buses such as memory bus, etc.), optional non-volatile storage 208 (e.g., any type of physical storage medium (or volume) such as hard drive/s, solid state drive/s "SSDs" and/or other non-volatile memory), Flash memory 230, and system volatile memory (e.g., DRAM) 204. An optional overlay cache 305 may be maintained on storage 208 as shown. The host processing device/s 202 of system 200 executes a version of the active application/s 282 and/or file/s 287 on a host operating system (OS) 280 that has a file-based write filter 284. Examples of such write filter-enabled operating systems include, but are not limited to, embedded or other reduced-function operating systems (e.g., a Windows Embedded operating system such as Windows Embedded Standard "WES") for thin clients, standard operating systems that have a write filter (e.g., such as Windows 10 Enterprise, Windows 10 IOT Enterprise, etc.), and existing personal computer (PC) or other systems with older generation legacy operating systems (e.g., such as Microsoft Windows 7) that have a write filter that is subsequently installed such as by a lockdown software.

Bus/es 223 provides a mechanism for the various components of system 200 to communicate and couple with one another. As shown, system 200 may be provided as shown with a network interface card (NIC) 260 that is communicatively coupled to network 190 to allow various components of system 200 to communicate through NIC 260 with components of other information handling systems (e.g., such as systems 290 and/or 291) across a network 190.

As further shown in FIG. 2, system 200 may include a video display device 209 (e.g., LCD display, LED display, etc.) that may be display a user interface (UI) 211 to a human user of the system 200. In one embodiment input/output (I/O) capability may be optionally integrated into display device 209 (e.g., LCD or LED display touchscreen device) for receiving user input from a human user, and/or separate input/output (I/O) component/s 217 (e.g., mouse, keyboard, etc.) may be optionally provided as shown for performing this function. Display and I/O component/s 209 and 217 may be coupled to bus 223 as shown and/or may be optionally coupled directly to host processing device 202 depending on the particular configuration of the given system (e.g., coupled directly to integrated graphics of a host processing device 202 and/or separately coupled via bus 223 to receive graphics display information from an optional graphics processor unit "GPU" not shown).

Other components of system 200 that may be coupled to host processing device 202 via bus/es 223 include, but are not limited to, an optional embedded controller (EC) 201 that may be present, for example, to perform hardware management and operation tasks for the coupled components of system 200. One or more external bus connectors (e.g., such as USB or other data bus connectors) may be also be present to allow bus 223 to be connected for data exchange between integrated components of systems 200 and a connected external data source, such as USB flash drive 289 as shown.

In FIG. 2, host processing device 200 is shown executing one or more active applications 282 (e.g., such as Windows Media Player, different web browser applications, Adobe Acrobat Reader, third party applications, etc.) and/or file/s 287 (e.g., such as relatively large PDF files, Cached Media files, temporary browser files like cookies, JPEG files, media files, downloaded files from websites, etc.) on OS 280, together with other logic or software components that include file-based write filter 284, overlay-managing write filter 277, write watcher driver 285, overlay consumption watcher service 286, and RAM disk consumption watcher service 288, and monitoring and management application 283. Each of the foregoing logic components may be executed by host processing device 202 and/or other processing devices of information handling system 200 as software, firmware or other code or list of instructions as described further herein.

As further shown in the embodiment of FIG. 2, system memory 204 may store data to support operation of host OS 280 and related logic components, such as application/s 282, file/s 287, file-based write filter 284, etc. in a manner that will be described further herein. Such data may include, but is not limited to, write filter memory overlay data 340, RAM disk data (e.g., of fixed memory size for background service use, storage of files loaded from Flash at startup, etc.), application and/or file write data 203, memory overlay consumption data 205, and RAM disk consumption data 207. System memory 204 and its internal partitions may be of any size suitable for a given application. In one example, system memory 204 may be 8 gigabytes in size, with write filter memory overlay 340 being elastic (initially minimum 64 kilobytes up to 2 gigabytes in size as needed for usage of write filter memory overlay 340) and RAM disk 206 being 512 kilobytes in size. As further shown in FIG. 2, one or more of these data components of system memory 204 may be alternatively or additionally maintained on a remote information handling system, such as administrative server 290, which may receive data from system 200, and provide data associated with operation of these components to system 200 across network 270 in a manner described further herein. For example, in FIG. 2, instances of application write data 293, overlay consumption data 295, ram disk consumption data 297, and monitoring management logic 299 are also maintained on administrative server 290, and have the same contents as their counterparts on system 200. In one exemplary embodiment, these components may be kept stored in non-volatile memory on server 290 for access by an administrator or for future access and tracking by the user of system 200.

Figure 3:
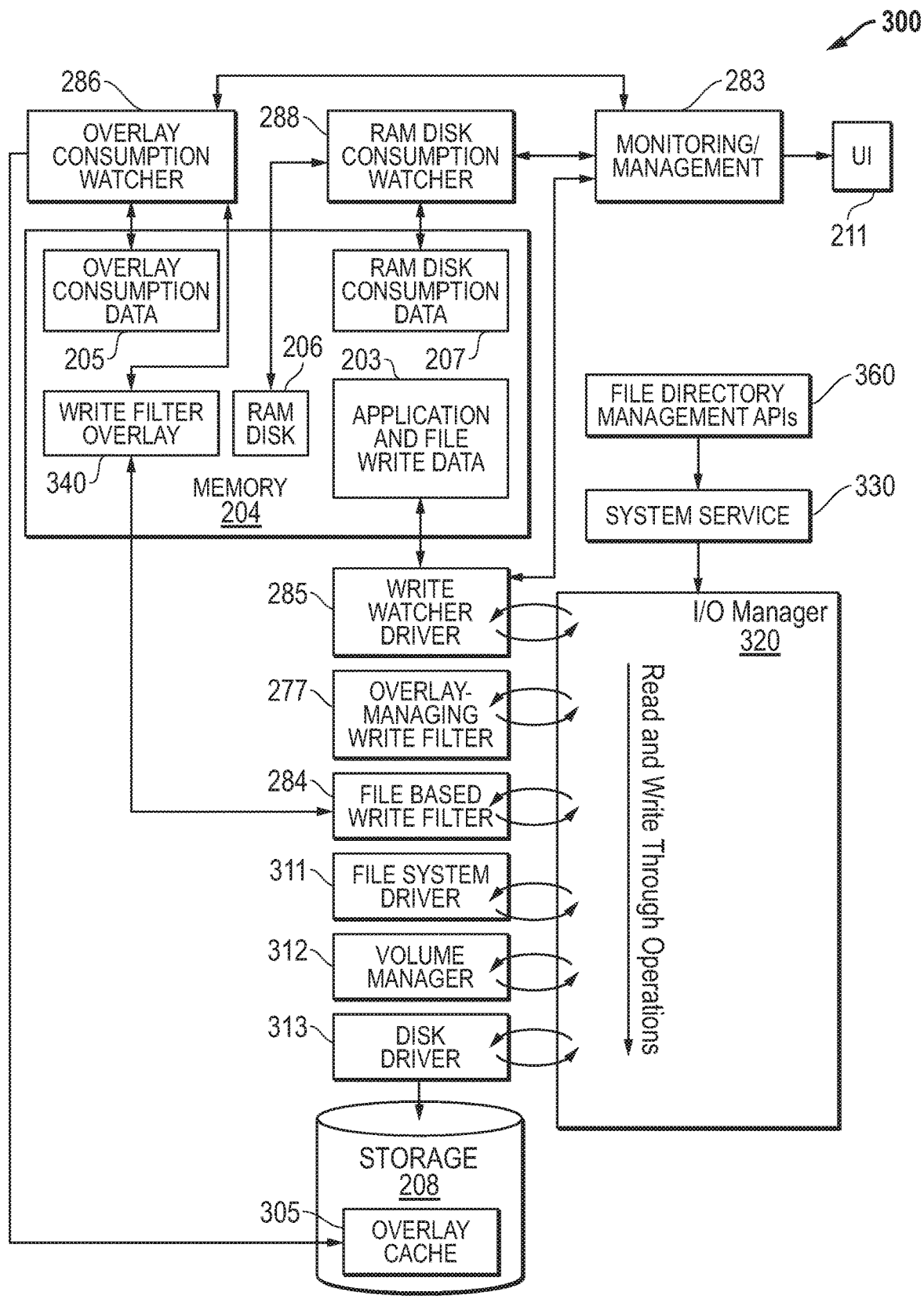
FIG. 3 illustrates a write filter architecture according to one exemplary embodiment of the disclosed systems and methods.

FIG. 3 illustrates one exemplary of an architecture 300 that may be implemented to achieve improved write filter performance according to the disclosed systems and methods. In accordance with the Windows architecture, a driver stack consisting of file system driver 311, volume manager 312, and disk driver 313 sit atop storage 208, and I/O manager 320 manages the flow of I/O requests through the driver stack. In this embodiment, application/s 282 and/or file/s 287 of FIG. 2 (not shown in FIG. 3) may employ file/directory management application programming interfaces (APIs) 360 to invoke a service of system services 330 (e.g., by calling ReadFile, WriteFile, CreateFile, etc. on a particular file) which results in I/O manager 320 creating an I/O request packet (IRP) for the request. This IRP is then be passed down through the driver stack.

In the embodiment of FIG. 3, file-based write filter 284 routes all I/O from storage 208 to write filter memory overlay 340. In this embodiment, file-based write filter 284 is a file-based write filter (i.e., File-based Write Filter (FBWF) that is included in the Windows Embedded operating system, any equivalent write filter that may be provided in future releases of Windows, or any write filter that performs equivalent functionality in other operating systems, that is, redirecting writes targeting a protected volume to a separate, and possibly temporary, storage location) that is positioned near the top of the driver stack beneath write watcher driver 285 and is therefore able to process an IRP prior to the IRP being passed down to the lower level drivers. File-based write filter 284 may be configured to detect writes targeting a protected volume (i.e., a volume storing artifacts that a file-based write filter protects from modification) and redirect them to write filter overlay 340 that is temporarily stored in system volatile memory, rather than allowing them to be passed down the driver stack. As a result, the write actually occurs in overlay 340 rather than to storage 208. File-based write filter 284 may be further configured to detect reads that target content that was previously redirected to overlay 340 and redirect these reads to overlay 340. In this way, even though it appears to the application/s 282 and/or file/s 287 that the content of storage 208 is being updated, the updates are actually being temporarily maintained in overlay 340. The contents of overlay 340 may be maintained until the operating system is restarted or until an explicit command is received to discard the contents of the overlay.

Also shown in FIG. 3 is optional overlay-managing write filter 277 may be used in conjunction with file-based write filter 284 to manage artifacts (i.e., files, directories, registry entries, or any other structure of a file system that can be modified via an I/O request) that are stored in write filter overlay 340, e.g., in a manner that prolongs the system up time. More particularly, overlay-managing write filter 277 may be configured to monitor which artifacts (e.g., files) in write filter overlay 340 are closed or not currently being accessed and may move them to an overlay cache 305 maintained in the protected volume on storage (e.g., disk) 208 to reduce the overlay write filter 340 fill amount and increase system uptime. In one embodiment, this movement of artifacts may occur every time the write filter overlay 340 becomes 60% full (or other predefined greater or lesser cache threshold overlay percentage or fractional fill value). After moving an artifact to overlay cache 305, overlay-managing write filter 277 may be configured to cause the artifact to be discarded from write filter overlay 340 thereby reducing the size of write filter overlay 340 to postpone the time duration until write filter overlay 340 become full enough to require automatic reboot. In such an embodiment write watcher driver 285 may be configured to effectively manage writes to write filter memory overlay 340 and overlay cache 305. Further information on configuration and operation of overlay-managing write filter 277 and overlay cache 305 may be found in United States Patent Application Publication Number 2018/0217940, which is incorporated herein by reference in its entirety for all purposes.

In the embodiment of FIG. 3, write watcher driver 285 is positioned at the top of the driver stack and is configured to watch all the writes from application/s 282 and/or files 287 destined for the write filter memory overlay 340 via file-based write filter 284 (as described further herein) or for RAM disk memory 206 via I/O manager 329 in real time and to determine the identity of the application from which write originated, e.g., by Iexplore, Chrome, notepad++, sublime text, other apps mentioned above, etc. Write watcher driver 285 may then store the results of this determination as a running total for each application 282 and/or file 287 as application and/or file write data 203 in system memory 203. In one embodiment application and/or file write data 203 may be stored as a simple Key, Value pair structure in which the key is the identity of each application/executable 282, 287 and the value being the amount or number of writes (and/or data size of these writes) to storage 208 and memory overlay 340 so far. Such a data structure may be employed to facilitate the query of the top applications that are consuming the capacity of memory overlay 205 and RAM disk 206 as further described herein. However, it will be understood that application and/or file write data 203 may be stored within system memory 204 in any other data structure form (e.g., such as a lookup table). In any case, application write data values for any given application 282 or file 287 may be erased once the given application 282 or file 287 is closed/deleted or otherwise killed by the system user or automatically closed/deleted or otherwise killed by monitoring/management logic 283, e.g., to postpone or prevent system reboot.

Still referring to FIG. 3, overlay consumption watcher 286 is configured in this embodiment as a background service that operates to periodically query the write filter memory overlay 340 to determine real time write filter memory overlay consumption (e.g., as a time-based fractional or percentage fill of the memory overlay 340 at different values of elapsed time). Overlay consumption watcher 286 may also query write watcher driver 285 and/or application and file write data 203 to determine write counts, device up time, files touched and modified size of each file, usage counter for RAM disk 206 and write filter memory overlay 340, etc. Overlay consumption watcher 286 may be further configured to use this queried data to create and update time-based write filter memory overlay consumption data 205 stored as shown in system memory 204, and overlay consumption watcher 286 may reset and update this memory overlay consumption data 205 after each system reboot. Write filter memory overlay consumption data 205 may be so stored in system memory 204 using any suitable data structure, e.g., such as similar data structures (e.g., Key, Value pair structure, lookup table, etc.) previously described above for storing application and/or file write data 203. In one embodiment, time-based overlay consumption data 205 may be stored as a Key, Value pair structure in which the Key of each given entry is a time stamp representing elapsed time (e.g., with time expressed in units of seconds or other suitable time units), and in which the Value of the same given entry corresponds to the amount of write filter memory overlay that is consumed by data (e.g., as a fractional or percentage fill of the memory overlay 340) at the elapsed time represented by the Key time stamp of the same given entry. Thus, as time elapses since last reboot, additional Key, Value pair structure entries may be added by overlay consumption watcher 286 to overlay consumption data 205 at predefined time intervals (e.g., such as once every five seconds although predefined time intervals may be shorter or longer, and may be configurable).

FIG. 3 also shows RAM disk consumption watcher 288 that may be configured in this embodiment as a background service that operates to periodically query the RAM disk 206 to determine real time RAM disk consumption (e.g., as a time-based fractional or percentage fill of the RAM disk 206 at different values of elapsed time). Similar to overlay consumption watcher 286, RAM disk consumption watcher 288 may also query write watcher driver 285 and/or application and file write data 203 to determine write counts, device up time, files touched and modified size of each file, usage counter for RAM disk 206 and write filter memory overlay 340, etc. RAM disk consumption watcher 288 may be further configured to use this queried data to create and update time-based RAM disk consumption data 207 stored as shown in system memory 204, and RAM disk consumption watcher 288 may reset and update this RAM disk consumption data 207 after each system reboot. RAM disk consumption data 207 may be so stored in system memory 204 using any suitable data structure, e.g., such as similar data structures (e.g., Key, Value pair structure, lookup table, etc.) previously described above for storing application and/or file write data 203 and overlay consumption data 205. In one embodiment, time-based RAM disk consumption data 207 may be stored as a Key, Value pair structure in which the Key of each given entry is a time stamp representing elapsed time (e.g., with time expressed in units of seconds or other suitable time units), and in which the Value of the same given entry corresponds to the amount of RAM disk that is consumed by data (e.g., as a fractional or percentage fill of the RAM disk 206) at the elapsed time represented by the Key time stamp of the same given entry. Thus, as time elapses since last reboot, additional Key, Value pair structure entries may be added by RAM disk consumption watcher 288 to RAM disk consumption data 207 at predefined time intervals (e.g., such as once every five seconds although predefined time intervals may be shorter or longer, and may be configurable).

Figure 4:
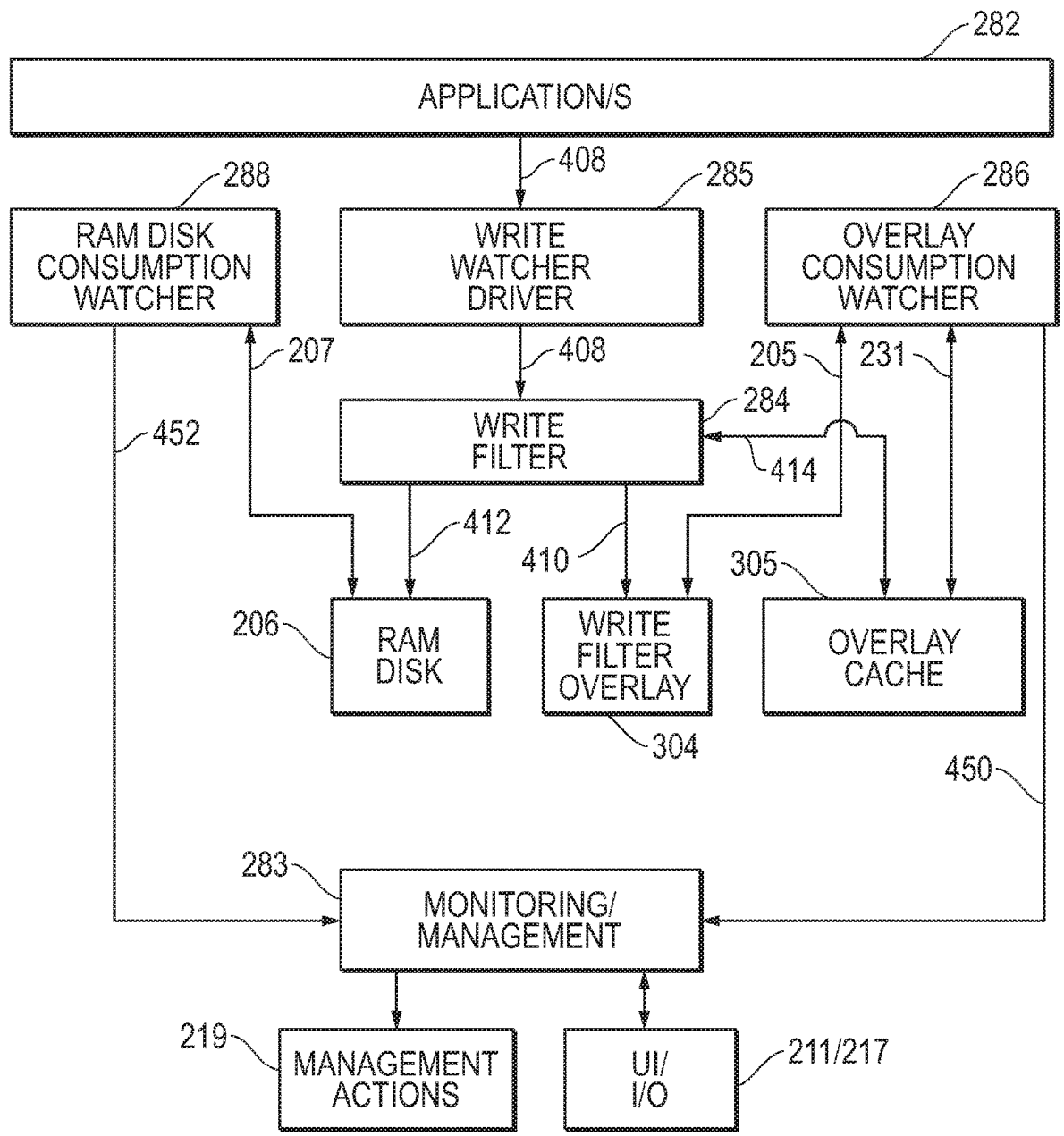
FIG. 4 illustrates interaction between various logic components according to one exemplary embodiment of the disclosed systems and methods.
Figure 5:
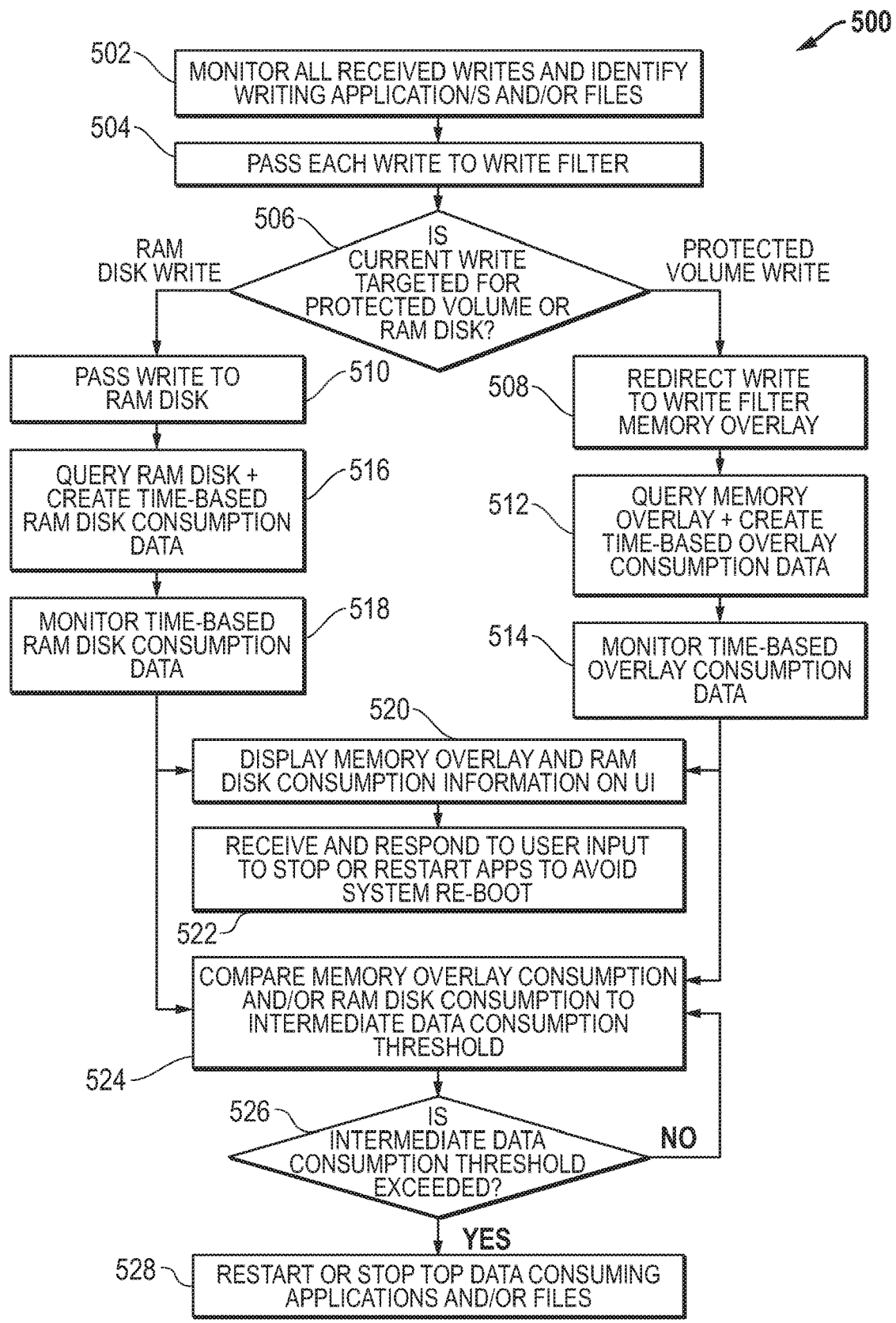
FIG. 5 illustrates methodology according to one exemplary embodiment of the disclosed systems and methods.
Figure 6:
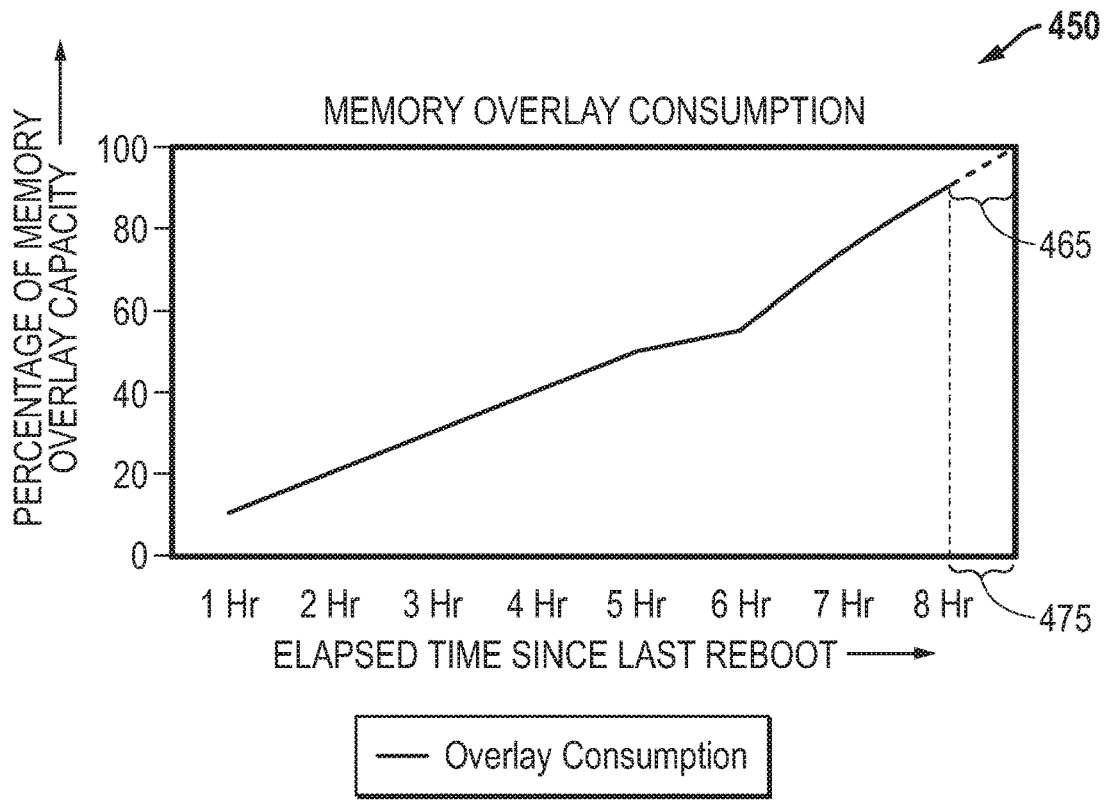
FIG. 6 illustrates write filter memory overlay consumption information according to one exemplary embodiment of the disclosed systems and methods.
Figure 7:
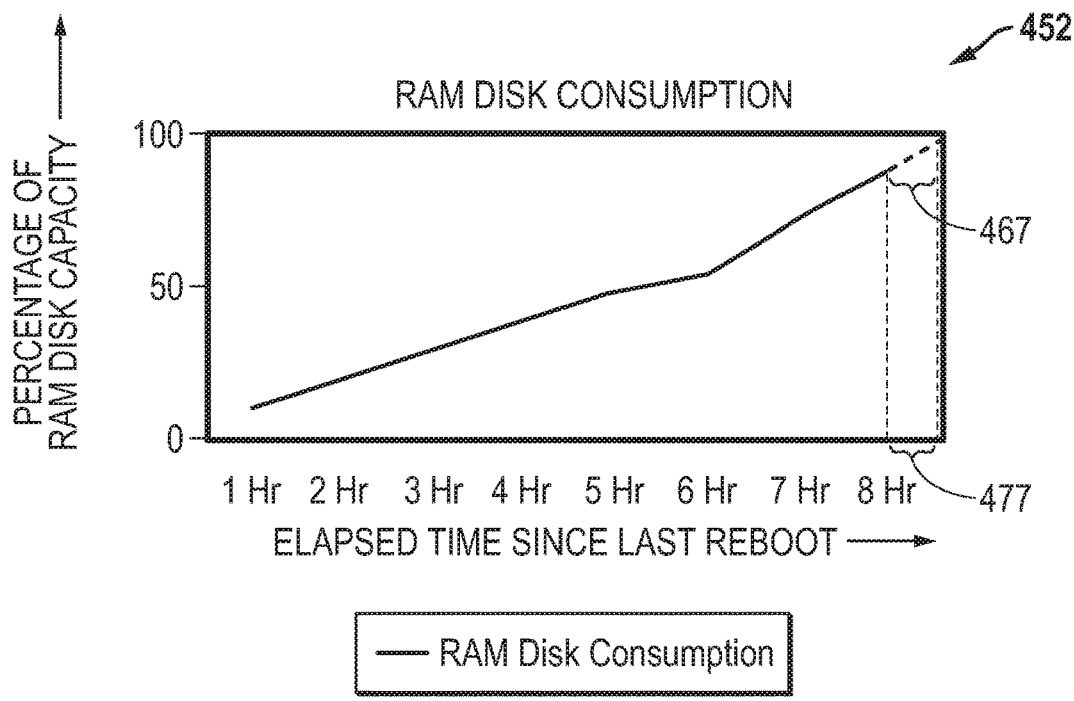
FIG. 7 illustrates RAM disk consumption information according to one exemplary embodiment of the disclosed systems and methods.

FIG. 4 illustrates interaction between various logic components of FIGS. 2 and 3 that are employed in one embodiment of the disclosed systems and methods. FIG. 5 illustrates one exemplary embodiment of methodology 500 that may be performed by the interaction of the logic components of FIG. 4. In step 502 of FIG. 5, all writes 408 received from application/s 282 and file/s 287 are monitored by write watcher driver 285 and the writing application/s identified, before being passed in step 504 as write data 408 to file-based write filter 284, where it is determined in step 506 if each individual write is destined for a protected volume of storage 208 or for RAM disk 206. Those writes 410 determined as targeting a protected volume of storage 208 are then redirected in step 508 to write filter memory overlay 304 and writes 412 that are determined to be targeted for RAM disk 206 are passed in step 510 on to RAM disk 206. It is noted that writes that are part of the exclusion list will go to storage 208 instead of either write filter memory overlay 304 or RAM disk 206.

step 512, overlay consumption watcher service 286 queries the write filter overlay 304 (and optionally the overlay cache 305 which may receive optional writes 414 as shown) to create the time-based memory overlay consumption data 205 which it retrieves and passes on in step 514 (e.g., as time based write filter memory overlay information 450 of FIG. 6) to monitoring/management logic 283 which monitors the time-based overlay consumption information 450. In step 516, RAM disk consumption watcher 288 queries the RAM disk 206 to create the time-based RAM disk consumption data 207 that it retrieves and passes on in step 518 (e.g., as time-based RAM disk information 452 of FIG. 7) to monitoring/management logic 283 which monitors the time-based RAM disk information 452.

Next, in step 520, monitoring/management logic 283 may generate a UI 211 (e.g., such as illustrated and described in relation to FIG. 8) that is displayed to a human user of information handling system 200 on display device 209. This UI may display memory overlay and RAM disk consumption information generated by monitoring/management logic 283 such as one or more application/s 282 and/or file/s 287 that are consuming the most memory overlay or RAM disk memory resources, time-based consumption data (e.g., graphs versus time) of memory overlay consumption and RAM disk consumption, predicted time to next automatic reboot, etc. In step 522, the user may respond to this displayed UI information by entering commands via I/O 217 to take actions to avoid automatic reboot of system 200 that would otherwise occur when write filter memory overlay 340 is full or completely consumed with data, e.g., such as restarting one or more application/s 282 and/or file/s 287 that are consuming the most memory overlay 340 and/or RAM disk 206 memory, or stopping such application/s 282 and/or file/s 287 to prevent write filter overlay 340 from completely filling with data.

Additionally or alternatively, monitoring/management logic 283 may be configured to take automatic monitoring and management actions 219 (i.e., without human user input) in steps 524-528 to similarly avoid the automatic reboot of system 200. For example, when monitored write filter memory overlay 340 and/or RAM disk 206 data consumption is determined in step 526 to reach a predefined intermediate data consumption threshold (e.g., 80% full or other greater or lesser predefined maximum data consumption threshold that is less than the predefined maximum data consumption threshold), then in step 528 monitoring/management logic 283 may automatically restart one or more application/s 282 and/or automatically delete one or more file/s 287 that are consuming the most memory overlay 340 memory resources and/or RAM disk 206 memory resources (or alternatively may automatically stop such application/s 282 and/or file/s 287) without rebooting system 200. Restarting or ending application/s 287 and/or reopening or closing file/s 287 acts to delete write filter memory overlay entries for these applications 282 and/or files 287, thus freeing up additional memory in write filter overlay 340, and preventing write filter overlay 340 from completely filling with data and causing automatic system reboot. At this time in step 528, monitoring/management logic 283 may also optionally display an explanation message on display device 209 that informs the user that the automatic action is being taken to avoid automatic system reboot.

It will be understood that methodology of FIG. 5 is exemplary only, and that any combination of fewer, additional and/or alternative steps may be employed that are suitable for postponing or preventing unexpected and/or uncontrollable system reboots that occur due to write filter overlay and/or RAM disk depletion.

Figure 8:
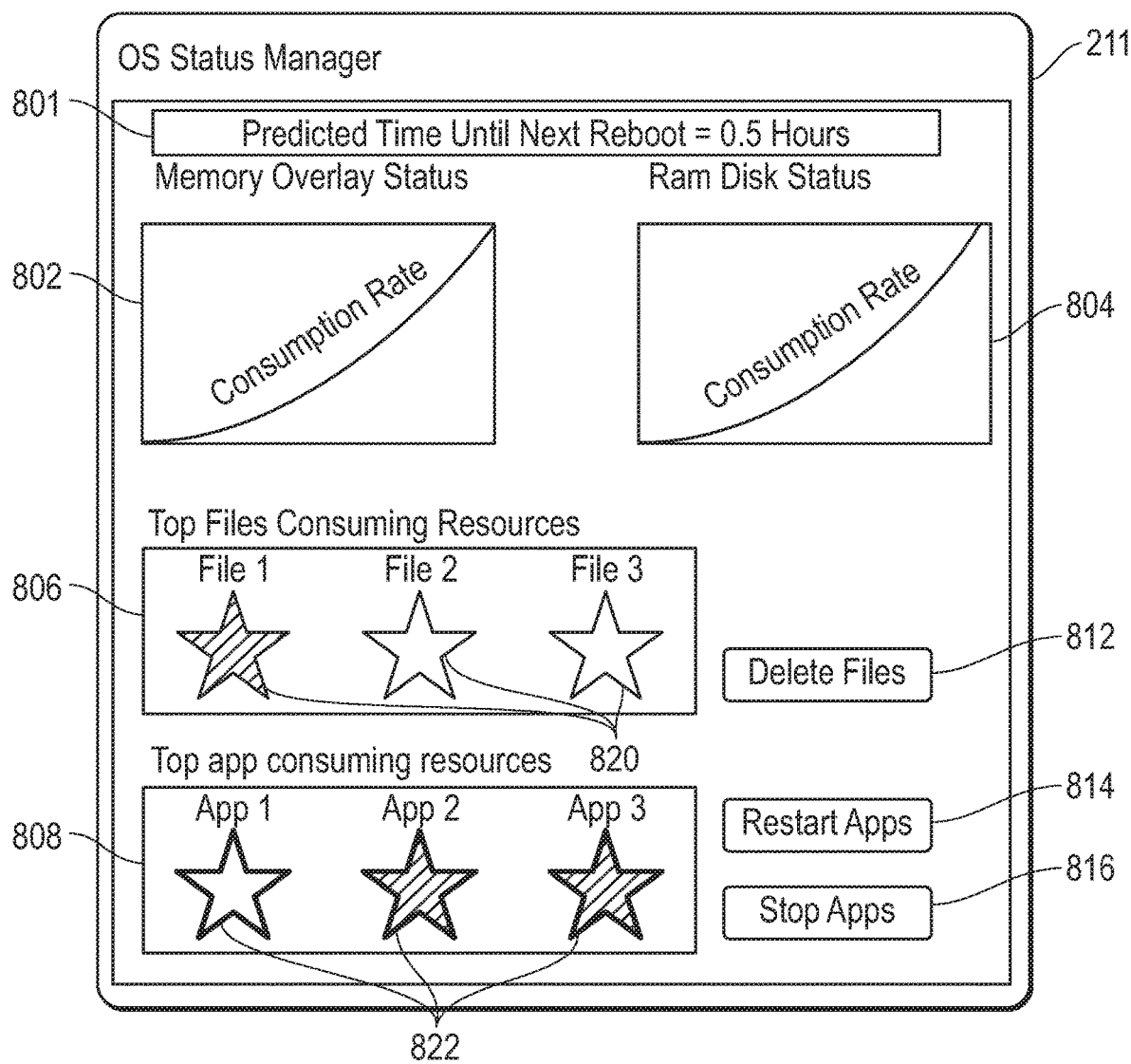
FIG. 8 illustrates a user interface (UI) according to one exemplary embodiment of the disclosed systems and methods.

FIG. 8 illustrates one exemplary embodiment of a UI 211 that may be generated by monitoring/management logic 283, and displayed to a human user of system 200, e.g., during step 520 of FIG. 5. In one embodiment, a small icon may be generated that sits or is displayed in the Microsoft Windows system tray and displays status of the embedded operating system, e.g., using colors and/or shapes. The small icon may be double clicked on by the user to pull up the full UI 211 in a window on the display screen of device 209. In this embodiment, UI 211 displays time-based write filter memory overlay consumption rate (e.g., change in memory overlay consumption per unit time versus elapsed time) 802 that may be calculated from memory overlay consumption information 450, and time-based RAM disk memory consumption rate (e.g., change in RAM disk consumption per unit time versus elapsed time) 804 that may be calculated from memory overlay consumption information 452. Also displayed may be a graphic 806 showing a predefined number (in this case three) of top memory resource-consuming file/s (e.g., selected by monitoring/management logic 283 as the file/s having the greatest number of cumulative writes in application/file write data 203 since the most recent system reboot). Also displayed may be a graphic 808 showing a predefined number (in this case three) of top memory resource-consuming application/s (e.g., selected by monitoring/management logic 283 as the application/s having the greatest number of cumulative writes in application/file write data 203 since the most recent system reboot).

In one embodiment of FIG. 8, the predicted time until next system reboot 801 based on current usage patterns may also be determined, updated in real time and displayed by monitoring/management logic 283, e.g., in this case showing 0.5 hours predicted as the soonest time until automatic system reboot by monitoring management logic 283 from either memory overlay consumption information 450 or RAM disk consumption information 452. Such a predicted time may be calculated by monitoring/management logic 283 from time-based write filter memory overlay consumption information 450 of FIG. 6 using any suitable predictive statistical or modeling technique.

For example, a relatively simple rate calculation may be performed determining a calculated time until 100% memory consumption will occur given a current fill rate of write filter memory overlay consumption per unit time and RAM disk consumption per unit time determined from percent amount of data consumption as a function of cumulative time elapsed. As an example only, the total up time of system 200 may be compared with current use percentage of the write filter memory overlay 340 or RAM disk 206 to determine a predicted time remaining before automatic reboot, e.g., where system 200 has currently been up and running for seven days since its last reboot and write filter memory overlay 340 is currently at 50% usage, then a predicted time until next reboot may be determined to be equal to ((7 days)/0.5)–(7 days already elapsed)) or seven more days before 100% usage of write filter memory overlay occurs and forces automatic reboot (making the assumption that the same usage rate continues). In a further embodiment, this calculation may be adjusted based on the current real time monitored use rate in a case of increased and/or decreased number of writes to the write filter memory overlay 340.

In another example, a linear regression algorithm may be applied by on graphical values of memory consumption versus elapsed time since last reboot may be used predict the time at which 100% memory consumption will occur and the system 200 will automatically reboot. In one exemplary embodiment, predicted time until next system reboot may be determined by extrapolating a linear trend (e.g., using linear regression analysis such as least squares analysis, linear model analysis, etc.) of memory overlay data consumption points 450 to determine predicted time duration 475 (e.g., in this example, 0.5 hours) until intersection of consumption trend with 100% memory overlay consumption as shown by dashed line 465 in FIG. 6. A similar analysis may be performed by monitoring management logic 283 on RAM disk consumption information 452 of FIG. 7 where predicted time duration until dashed line 467 intersects 100% RAM disk consumption at a predicted time duration 477 of 0.5 hours.

Where both time-based write filter memory overlay consumption and time-based RAM disk consumption are monitored and used to predict the next system reboot time, the predicted time value until next reboot 801 to be displayed to the user by monitoring management logic 283 may be determined as being the minimum of the two time durations 475 and 477 when these values differ. In the illustrated embodiment, both time duration values equal 0.5 hours, and therefore 0.5 hours is displayed in UI 211 to give the user an idea of how much time remains until automatic system reboot if no actions are taken to reduce the magnitude and/or rate of increase of memory overlay consumption and/or RAM disk consumption. In another embodiment, the two different time durations 475 and 477 may be averaged together to determine a simple average predicted time until next system reboot, or may be weight-averaged together, e.g., with time duration 475 determined from rate of write filter memory overlay consumption given a larger weight (such as 0.75) than the weight (such as 0.25) given to time duration 477 determined from rate of RAM disk consumption.

As described elsewhere herein the primary reasons (application/s and/or file/s) responsible for why the system is going is reboot may be determined from the identity of application/s 282 and/or files 287 that are primarily filling up the write filter overlay memory 340 or RAM disk 206 with data. This information may be determined from the files or data written to memory 204 (e.g., by determining which application/s 282 and/or files 287 have written the files or other data that are currently consuming the write filter overlay memory 340 or RAM disk 206) and may be stored in application/file write data 203 in a manner as described elsewhere herein. This information may then be retrieved and used to determine and display the top resource-consuming files 806 and top resource-consuming applications 808 in UI 211. UI 211 may be further implemented to allow the user to select individual file/s 806 and/or application/s 808 by clicking to highlight their respective stars 820 and/or 822 as shown in FIG. 8 (which shows File 1 highlighted and Applications 2 and 3 highlighted).

Examples of user actions that may be taken on the highlighted files and applications of UI 211 to postpone or prevent automatic system reboot include, but are not limited to, clicking on one or more of buttons 812, 814 or 816 to cause monitoring management logic 283 to take the indicated action/s by instructing host processing device to: delete these user-selected files, restart these user-selected applications, and/or stop these user-selected applications, respectively. In this way, UI 211 may be implemented to allow the user to restart or stop selected application/s 282 (which may remove associated temporary application files) or delete larger non-temporary files after they are no longer needed to free up write filter memory overlay space and thus provide increased remaining system up time before next automatic reboot. It will be understood that in cases where files were downloaded or saved by the user, then those files will remain in write filter memory overlay 340 until system reboot occurs (unless explicitly deleted by the user or administrator). Application and file usage of RAM Disk overlay 206 may also be similarly tracked and large files may be deleted to clear up RAM Disk space as well if needed.

It will be understood that one or more of the tasks, functions, or methodologies described herein (e.g., including those described herein for components 201, 202, 204, 277, 282, 283, 284, 285, 286, 287, 288, 290, 291, 299, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. An information handling system, comprising:
  a system memory having an application and file write data portion that partially occupies the system memory, and
    at least one of a write filter memory overlay portion having a fixed memory size that partially occupies the system memory or a random access memory (RAM)

disk portion having a fixed memory size that partially occupies the system memory; and a programmable integrated circuit coupled to the system memory, the programmable integrated circuit being programmed to manage writes to the portions of the system memory;

where the programmable integrated circuit is further programmed to delay or prevent an automatic system reboot due to excessive write filter memory portion consumption and/or excessive RAM disk memory consumption by determining and using at least one of a real time consumption of the fixed memory size of the write filter memory overlay portion and/or a real time consumption of the fixed memory size of the RAM disk portion to cause at least one of a user or the programmable integrated circuit to reduce the consumption of the write filter memory overlay portion and/or the real time consumption of the fixed memory size of the RAM disk portion before occurrence of the automatic system reboot.

2. The system of claim 1, where the programmable integrated circuit is further programmed to at least one of:

communicate an indication of at least one of the determined real time consumption of the fixed memory size of the write filter memory overlay portion and/or the determined real time consumption of the fixed memory size of the RAM disk portion to a user of the information handling system, and then receive an input from the user in response to the communicated indication to cause a reduction in at least one of the real time consumption of the fixed memory size of the write filter memory overlay portion or the real time consumption of the fixed memory size of the RAM disk portion to delay or prevent the automatic system reboot, or compare the determined real time consumption of the fixed memory size of the write filter memory overlay portion to a predefined intermediate consumption value threshold of the write filter memory overlay portion or compare the determined real time consumption of the fixed memory size of the RAM disk portion to a predefined intermediate threshold of the RAM disk portion, and then perform at least one of the following actions to delay or prevent the automatic system reboot:

automatically cause a reduction in the real time consumption of the fixed memory size of the write filter memory overlay portion if the determined real time consumption of the fixed memory size of the write filter memory overlay portion is equal to or greater than the predefined intermediate consumption value threshold of the write filter memory overlay portion, or automatically cause a reduction in the real time consumption of the fixed memory size of the RAM disk portion if the determined real time consumption of the fixed memory size of the RAM disk portion is equal to or greater than the predefined intermediate consumption value threshold of the RAM disk portion.

3. The system of claim 1, the programmable integrated circuit executing one or more applications and/or files that generate the writes to the write filter memory and RAM disk portions of the system memory, the programmable integrated circuit being programmed to cause the automatic reboot of the system when at least one of the write filter memory overlay portion contains an amount of written data that is equal to or greater than a predefined maximum consumption value threshold of the write filter memory overlay portion or the RAM disk portion contains an amount of written data that is equal to or greater than a predefined maximum consumption value threshold of the RAM disk portion.

4. The system of claim 3, further comprising a display device coupled to the programmable integrated circuit; and where the programmable integrated circuit is programmed to:

determine at least one of a time-based consumption rate of the fixed memory size of the write filter memory overlay and/or a time-based consumption rate of the fixed memory size of the RAM disk portion as a function of time;

determine a real time predicted time duration until occurrence of the next automatic system reboot based on the determined time-based consumption rate of the fixed memory size of the write filter memory overlay and/or the determined time-based consumption rate of the fixed memory size of the RAM disk portion; and display to a user on the display device an indication of the determined predicted time until the next automatic system reboot.

5. The system of claim 3, where the programmable integrated circuit is further programmed to compare the determined real time consumption of the fixed memory size of the write filter memory overlay portion to a predefined intermediate consumption value threshold of the write filter memory overlay portion or comparing the determined real time consumption of the fixed memory size of the RAM disk portion to a predefined intermediate threshold of the RAM disk portion, and then automatically causing a reduction in at least one of the real time consumption of the fixed memory size of the write filter memory overlay portion or the real time consumption of the fixed memory size of the RAM disk portion to delay or prevent the automatic system reboot; and where the predefined intermediate consumption value threshold of the write filter memory overlay portion is less than the predefined maximum consumption value threshold of the write filter memory overlay portion, and the predefined intermediate consumption value threshold of the RAM disk portion is less than the predefined maximum consumption value threshold of the RAM disk portion.

6. The system of claim 3, where the programmable integrated circuit is further programmed to:

monitor writes from the applications and/or files to at least one of the write filter memory overlay portion or the RAM disk portion;

determine an identity of one or more of the applications or files generating the highest number of cumulative writes to the write filter memory overlay portion of all respective applications or files writing to the write filter memory overlay portion over a given period of time since a most recent system reboot, or determine an identity of one or more of the applications or files generating the highest number of cumulative writes to the RAM disk portion of all respective applications or files writing to the write filter memory overlay portion over a given period of time since a most recent system reboot; and then automatically restart and/or stop one or more of the identified applications to cause a reduction in at least one of the real time consumption of the fixed memory size of the write filter memory overlay portion or the real time consumption of the fixed memory size of the RAM disk portion to delay or prevent the automatic system reboot, and/or then automatically delete one or more of the identified files to cause a reduction in at least one of the real time consumption of the fixed memory size of the write filter memory overlay portion or the real time consumption of the fixed memory size of the RAM disk portion to delay or prevent the automatic system reboot.

7. The system of claim 3, where the programmable integrated circuit is programmed to monitor writes from the applications and/or files to at least one of the write filter memory overlay portion or the RAM disk portion, and to determine at least one of:
  identity of one or more of the applications or files generating the highest number of cumulative writes to the write filter memory overlay portion of all respective applications or files writing to the write filter memory overlay portion over a given period of time since a most recent system reboot, or
  identity of one or more of the applications or files generating the highest number of cumulative writes to the RAM disk portion of all respective applications or files writing to the write filter memory overlay portion over a given period of time since a most recent system reboot.

8. The system of claim 7, further comprising a display device coupled to the programmable integrated circuit; and where the programmable integrated circuit is programmed to:
  display on the display device the determined identity of the one or more of the applications or files generating the highest number of cumulative writes to the write filter memory overlay portion, and/or display on the display device the determined identity of the one or more of the applications or files generating the highest number of cumulative writes to the RAM disk portion; and
  then restart and/or stop one or more of the displayed identified applications in response to input from the user to cause a reduction in at least one of the real time consumption of the fixed memory size of the write filter memory overlay portion or the real time consumption of the fixed memory size of the RAM disk portion to delay or prevent the automatic system reboot, and/or then delete one or more of the displayed identified files in response to input from the user to cause a reduction in at least one of the real time consumption of the fixed memory size of the write filter memory overlay portion or the real time consumption of the fixed memory size of the RAM disk portion to delay or prevent the automatic system reboot.

9. The system of claim 1, further comprising a display device coupled to the programmable integrated circuit; and where the programmable integrated circuit is programmed to:
  determine at least one of a time-based consumption rate of the fixed memory size of the write filter memory overlay portion and/or a time-based consumption rate of the fixed memory size of the RAM disk portion as a function of time; and
  display to a user on the display device an indication of the determined time-based consumption rate of the fixed memory size of the write filter memory overlay portion and/or the determined time-based consumption rate of the fixed memory size of the RAM disk portion as a function of time.

10. The system of claim 1, where the system comprises a write filter memory overlay portion having a fixed memory size that partially occupies the system memory; and where the programmable integrated circuit is further programmed to delay or prevent the automatic system reboot due to excessive write filter memory overlay portion consumption by determining and using a real time consumption of the fixed memory size of the write filter memory overlay portion to cause at least one of a user or the programmable integrated circuit to reduce the consumption of the write filter memory overlay portion before the automatic system reboot.

11. The system of claim 1, where the system comprises a write RAM disk portion having a fixed memory size that partially occupies the system memory; and where the programmable integrated circuit is further programmed to delay or prevent the automatic system reboot due to excessive RAM disk portion consumption by determining and using a real time consumption of the fixed memory size of the RAM disk portion to cause at least one of a user or the programmable integrated circuit to reduce the consumption of the RAM disk portion before the automatic system reboot.

12. A method of operating an information handling system that includes a system memory, the method comprising:
  managing writes to multiple portions of the system memory that each partially occupies a part of the system memory, the portions including an application and file write data portion, and at least one of a write filter memory overlay portion having a fixed memory size or a random access memory (RAM) disk portion having a fixed memory size; and
  delaying or preventing an automatic system reboot due to excessive write filter memory portion consumption and/or excessive RAM disk memory consumption by determining and using at least one of a real time consumption of the fixed memory size of the write filter memory overlay portion and/or a real time consumption of the fixed memory size of the RAM disk portion to cause at least one of a user or the programmable integrated circuit to reduce the consumption of the write filter memory overlay portion and/or the real time consumption of the fixed memory size of the RAM disk portion before occurrence of the automatic system reboot.

13. The method of claim 12, further comprising communicating an indication of at least one of the determined real time consumption of the fixed memory size of the write filter memory overlay portion and/or the determined real time consumption of the fixed memory size of the RAM disk portion to a user of the information handling system, and then receiving an input from the user in response to the communicated indication to cause a reduction in at least one of the real time consumption of the fixed memory size of the write filter memory overlay portion or the real time consumption of the fixed memory size of the RAM disk portion to delay or prevent the automatic system reboot.

14. The method of claim 12, further comprising comparing the determined real time consumption of the fixed memory size of the write filter memory overlay portion to a predefined intermediate consumption value threshold of the write filter memory overlay portion and/or comparing the determined real time consumption of the fixed memory size of the RAM disk portion to a predefined intermediate threshold of the RAM disk portion; and then delaying or preventing the automatic system reboot by at least one of:
  automatically causing a reduction in the real time consumption of the fixed memory size of the write filter memory overlay portion if the real time consumption of the write filter memory overlay portion is determined to be equal to or greater than the predefined intermediate consumption value threshold of the write filter memory overlay portion, or automatically causing a reduction in the real time consumption of the fixed memory size of the RAM disk portion if the real time consumption of the RAM disk portion is determined to equal to or be greater than the predefined intermediate consumption value threshold of the RAM disk portion.

15. The method of claim 12, further comprising executing one or more applications and/or files that generate the writes to the write filter memory and RAM disk portions of the system memory; and causing the automatic reboot of the system when at least one of the write filter memory overlay portion contains an amount of written data that is equal to or greater than a predefined maximum consumption value threshold of the write filter memory overlay portion or the RAM disk portion contains an amount of written data that is equal to or greater than a predefined maximum consumption value threshold of the RAM disk portion.

16. The method of claim 15, further comprising comparing the determined real time consumption of the fixed memory size of the write filter memory overlay portion to a predefined intermediate consumption value threshold of the write filter memory overlay portion or comparing the determined real time consumption of the fixed memory size of the RAM disk portion to a predefined intermediate threshold of the RAM disk portion; and then automatically causing a reduction in at least one of the real time consumption of the fixed memory size of the write filter memory overlay portion or the real time consumption of the fixed memory size of the RAM disk portion to delay or prevent the automatic system reboot; where the predefined intermediate consumption value threshold of the write filter memory overlay portion is less than the predefined maximum consumption value threshold of the write filter memory overlay portion, and the predefined intermediate consumption value threshold of the RAM disk portion is less than the predefined maximum consumption value threshold of the RAM disk portion.

17. The method of claim 15, further comprising:
monitoring writes from the applications and/or files to at least one of the write filter memory overlay portion or the RAM disk portion;
determining at least one of an identity of one or more of the applications or files generating the highest number of cumulative writes to the write filter memory overlay portion of all respective applications or files writing to the write filter memory overlay portion over a given period of time since a most recent system reboot, or an identity of one or more of the applications or files generating the highest number of cumulative writes to the RAM disk portion of all respective applications or files writing to the write filter memory overlay portion over a given period of time since a most recent system reboot; and
then automatically restarting and/or stopping one or more of the identified applications to cause a reduction in at least one of the real time consumption of the fixed memory size of the write filter memory overlay portion or the real time consumption of the fixed memory size of the RAM disk portion to delay or prevent the automatic system reboot, and/or then automatically deleting one or more of the identified files to cause a reduction in at least one of the real time consumption of the fixed memory size of the write filter memory overlay portion or the real time consumption of the fixed memory size of the RAM disk portion to delay or prevent the automatic system reboot.

18. The method of claim 15, further comprising monitoring writes from the applications and/or files to at least one of the write filter memory overlay portion or the RAM disk portion, and determining at least one of:
identity of one or more of the applications or files generating the highest number of cumulative writes to the write filter memory overlay portion of all respective applications or files writing to the write filter memory overlay portion over a given period of time since a most recent system reboot, or
identity of one or more of the applications or files generating the highest number of cumulative writes to the RAM disk portion of all respective applications or files writing to the write filter memory overlay portion over a given period of time since a most recent system reboot.

19. The method of claim 18, further comprising:
displaying to a user the determined identity of the one or more of the applications or files generating the highest number of cumulative writes to the write filter memory overlay portion, and/or displaying to the user the determined identity of the one or more of the applications or files generating the highest number of cumulative writes to the RAM disk portion; and then at least one of:
restarting and/or stopping one or more of the displayed identified applications in response to input from the user to cause a reduction in at least one of the real time consumption of the fixed memory size of the write filter memory overlay portion or the real time consumption of the fixed memory size of the RAM disk portion to delay or prevent the automatic system reboot, or
deleting one or more of the displayed identified files in response to input from the user to cause a reduction in at least one of the real time consumption of the fixed memory size of the write filter memory overlay portion or the real time consumption of the fixed memory size of the RAM disk portion to delay or prevent the automatic system reboot.

20. The method of claim 15, further comprising:
determining at least one of a time-based consumption rate of the fixed memory size of the write filter memory overlay and/or a time-based consumption rate of the fixed memory size of the RAM disk portion as a function of time;
determining a real time predicted time duration until occurrence of the next automatic system reboot based on the determined time-based consumption rate of the fixed memory size of the write filter memory overlay and/or the determined time-based consumption rate of the fixed memory size of the RAM disk portion; and
displaying to a user on the display device an indication of the determined predicted time until the next automatic system reboot.

21. The method of claim 12, further comprising:
determining at least one of a time-based consumption rate of the fixed memory size of the write filter memory overlay portion and/or a time-based consumption rate of the fixed memory size of the RAM disk portion as a function of time; and
displaying to a user an indication of the determined time-based consumption rate of the fixed memory size of the write filter memory overlay portion and/or the determined time-based consumption rate of the fixed memory size of the RAM disk portion as a function of time.

22. The method of claim 12, where the system comprises a write filter memory overlay portion having a fixed memory size that partially occupies the system memory; and where the method further comprises delaying or preventing the automatic system reboot due to excessive write filter memory overlay portion consumption by determining and using a real time consumption of the fixed memory size of the write filter memory overlay portion to cause at least one of a user or the programmable integrated circuit to reduce the consumption of the write filter memory overlay portion before the automatic system reboot.

23. The method of claim 12, where the system comprises a write RAM disk portion having a fixed memory size that partially occupies the system memory; and where the method further comprises preventing the automatic system reboot due to excessive RAM disk portion consumption by determining and using a real time consumption of the fixed memory size of the RAM disk portion to cause at least one of a user or the programmable integrated circuit to reduce the consumption of the RAM disk portion before the automatic system reboot.

\* \* \* \* \*